(12) United States Patent
Patel

(10) Patent No.: US 12,003,910 B1
(45) Date of Patent: Jun. 4, 2024

(54) CHARGING SYSTEM, DEVICE FOR CHARGING EARPHONES WHILE EARPHONES ARE IN USE, PROCESS, AND METHOD OF USE

(71) Applicant: 1 alpha LLC, Los Angeles, CA (US)

(72) Inventor: Kash Patel, Los Angeles, CA (US)

( * ) Notice: Subject to any disclaimer, the term of this patent is extended or adjusted under 35 U.S.C. 154(b) by 0 days.

(21) Appl. No.: 18/388,526

(22) Filed: Nov. 9, 2023

(51) Int. Cl.
  *H04R 1/10* (2006.01)
  *H02J 50/00* (2016.01)
  *H02J 50/10* (2016.01)

(52) U.S. Cl.
  CPC .......... *H04R 1/1025* (2013.01); *H02J 50/005* (2020.01); *H02J 50/10* (2016.02); *H04R 1/1033* (2013.01); *H04R 1/1016* (2013.01); *H04R 2420/07* (2013.01); *H04R 2420/09* (2013.01)

(58) Field of Classification Search
  CPC ..... H04R 1/1025; H04R 1/1033; H02J 50/10; H02J 50/005
  See application file for complete search history.

(56) References Cited

U.S. PATENT DOCUMENTS

| | | | |
|---|---|---|---|
| 9,210,498 B1 * | 12/2015 | Shaffer | H02J 50/90 |
| 2013/0079584 A1 * | 3/2013 | Armbruster | H04R 25/75 |
| | | | 600/28 |
| 2016/0134959 A1 * | 5/2016 | Shaffer | H04R 1/1025 |
| | | | 381/74 |
| 2018/0041617 A1 * | 2/2018 | Shamsoddini | H01Q 1/38 |
| 2020/0029149 A1 * | 1/2020 | Nielsen | H04R 1/1025 |

* cited by examiner

*Primary Examiner* — Simon King

(57) ABSTRACT

A charging system, a device for charging earphones while the earphones are in use, process, and method of use are presented. The present disclosure is configured to provide a wireless, magnetic-induction charging cable for charging and/or recharging headphones and/or wireless headphones and/or earphones. In the arrangement shown, as one example, system 10 is generally configured of a cable having two ends. One end, a plug end (to be further described herein), accepts power from a power source. This end may be formed of a USB-C type connection, a Thunderbolt® connection, or the like. The charging end is configured to connect and accept wireless headphones therein, such as Airpods®, for example. Another example, and in an alternative embodiment, the charging end is configured to accept with close and tight tolerances, as well as through magnetic securement, Pixel Buds® for charging through inductance.

20 Claims, 10 Drawing Sheets

CHARGING SYSTEM, DEVICE FOR CHARGING EARPHONES WHILE EARPHONES ARE IN USE, PROCESS, AND METHOD OF USE

FIELD OF THE DISCLOSURE

This disclosure relates to a charging system, a device for charging earphones while the earphones are in use, process, and method of use. More specifically, and without limitation, the present disclosure relates to a charging system for earphones. More specifically, and without limitation, the present disclosure relates to a charging system for earphones which can charge the earphones while the earphones are in use.

COPYRIGHT NOTICE

At least a portion of the disclosure of this patent document contains material that is subject to copyright protection. The copyright owner has no objection to the facsimile reproduction by anyone of the patent document or the patent disclosure, as it appears in the Patent and Trademark Office patent files and/or records, but otherwise reserves all copyright rights whatsoever. The following notice applies to the software and data as described below and in the drawings that form a part of this document. Copyright Kash Patel. All rights reserved.

BACKGROUND OF THE DISCLOSURE

Portable entertainment and communication equipment are proliferating, including devices such as smartphones, earphones, wireless headsets, tablets, portable computers, and portable computing devices. In recent times, earphones have grown in importance as users work from home, work on the move, or engage with audio and speaking capabilities anywhere in the world. Earphones have become a critical component in productivity, entertainment, communication, and the like.

In this way, earphones form a large part of the user experience when engaging in conversations such as video chats, audio chats, phone calls, voice to text, text to audio, video watching, and many other forms of engagement such as live translation and the like. Modern earphones include noise canceling, but also noise allowing, which means the earphones can be worn at all time for the convenience of the user. However, earphones are very small. This has proven to be problematic with battery life and battery power. Users must remove an earphone and charge the earphone. During this time, earphones are rendered useless and/or a user must purchase additional earphones as a replacement for earphones which are being charged. Finding charging for earphones when on the move, such as a commute, or the like can also be difficult.

Said another way, and for example, Bluetooth headsets are available for telephone conversations as well as headphones for audio listening. Because the headphones/headsets are wireless, they are required to provide their own power source, typically a battery (wired headphones/headsets are powered by the base system). Many use rechargeable batteries and require a method for recharging the batteries.

Thus, there is a long-felt need in the art for a charging system, a device for charging earphones while the earphones are in use, process, and method of use which improves upon the state of the art and solves the battery and power problem associated with the inconvenience of wireless headphones and/or wireless headsets. Furthermore, there is a need in the state of the art which improves upon convenience, providing for charging while the headset is still in use, on the go, and from a power source which can move with the user.

The disclosure herein provides these advantages and others as will become clear from the specification and claims provided.

SUMMARY OF THE DISCLOSURE

A charging system, a device for charging earphones while the earphones are in use, process, and method of use are presented.

More specifically, and without limitation, the present disclosure relates to a charging system, a device for charging earphones while the earphones are in use, process, and method of use which improves upon the state of the art and solves the battery and power problem associated with the inconvenience of wireless headphones and/or wireless headsets. Furthermore, there is a need in the state of the art which improves upon convenience, providing for charging while the headset is still in use, on the go, and from a power source which can move with the user.

Said another way, and without limitation, a charging system, a device for charging earphones while the earphones are in use, process, and method of use which improves upon the state of the art and provides a wireless headphone charging system and charging cable for the purpose of recharging wireless headphones; specifically, charging the earphones while the earphones are in use.

Thus, it is a primary object of the disclosure to provide a charging system, a device for charging earphones while the earphones are in use, process, and method of use that improves upon the state of the art.

Another object of the disclosure is to provide a charging system, a device for charging earphones while the earphones are in use, process, and method of use that is wireless.

Yet another object of the disclosure is to provide a charging system, a device for charging earphones while the earphones are in use, process, and method of use that is magnetic.

Another object of the disclosure is to provide a charging system, a device for charging earphones while the earphones are in use, process, and method of use that is magnetic-induction.

Yet another object of the disclosure is to provide a charging system, a device for charging earphones while the earphones are in use, process, and method of use that provides a charging cable.

Another object of the disclosure is to provide a charging system, a device for charging earphones while the earphones are in use, process, and method of use that recharges wireless headphones.

Yet another object of the disclosure is to provide a charging system, a device for charging earphones while the earphones are in use, process, and method of use that recharges wireless headphones while the headphones are in use.

Another object of the disclosure is to provide a charging system, a device for charging earphones while the earphones are in use, process, and method of use that includes two separate induction chargers.

Yet another object of the disclosure is to provide a charging system, a device for charging earphones while the earphones are in use, process, and method of use that has two ends.

Another object of the disclosure is to provide a charging system, a device for charging earphones while the earphones are in use, process, and method of use that utilizes a mobile power source.

Yet another object of the disclosure is to provide a charging system, a device for charging earphones while the earphones are in use, process, and method of use that can draw power from a smartphone, smart device, computer, laptop, outlet, and the like.

Another object of the disclosure is to provide a charging system, a device for charging earphones while the earphones are in use, process, and method of use that works with USB-C.

Yet another object of the disclosure is to provide a charging system, a device for charging earphones while the earphones are in use, process, and method of use that works with Thunderbolt™ connections, Lighting™ connections, and the like.

Another object of the disclosure is to provide a charging system, a device for charging earphones while the earphones are in use, process, and method of use that includes a plurality of magnetic tips that coincide with wireless headphone magnets for securement during charging and use.

Yet another object of the disclosure is to provide a charging system, a device for charging earphones while the earphones are in use, process, and method of use that are comfortable.

Another object of the disclosure is to provide a charging system, a device for charging earphones while the earphones are in use, process, and method of use that are comfortable to wear during use.

Yet another object of the disclosure is to provide a charging system, a device for charging earphones while the earphones are in use, process, and method of use that eliminates the need for a carrying case and/or charging case.

Another object of the disclosure is to provide a charging system, a device for charging earphones while the earphones are in use, process, and method of use that extend the effective life of wireless headphones.

Yet another object of the disclosure is to provide a charging system, a device for charging earphones while the earphones are in use, process, and method of use that work with a plurality of charging connections and/or cord and/or plug types.

Another object of the disclosure is to provide a charging system, a device for charging earphones while the earphones are in use, process, and method of use that include an onboard power supply.

Yet another object of the disclosure is to provide a charging system, a device for charging earphones while the earphones are in use, process, and method of use that easily adapt and connect to a plurality of charging connections and/or cord and/or plug types.

Another object of the disclosure is to provide a charging system, a device for charging earphones while the earphones are in use, process, and method of use that is easy to use.

Another object of the disclosure is to provide a charging system, a device for charging earphones while the earphones are in use, process, and method of use that include an onboard rechargeable battery system.

Another object of the disclosure is to provide a charging system, a device for charging earphones while the earphones are in use, process, and method of use that include an onboard plurality of rechargeable batteries.

Another object of the disclosure is to provide a charging system, a device for charging earphones while the earphones are in use, process, and method of use that includes headphones.

Another object of the disclosure is to provide a charging system, a device for charging earphones while the earphones are in use, process, and method of use that includes portable, wireless, bluetooth headphones.

Yet another object of the disclosure is to provide a charging system, a device for charging earphones while the earphones are in use, process, and method of use that include a plurality of indicator lights.

Yet another object of the disclosure is to provide a charging system, a device for charging earphones while the earphones are in use, process, and method of use that is safe to use; both for a user and for the earphones—the system including circuits and features which detect the model of earphone and apply the optimized voltage and/or current for desired charging speeds and optimization of battery life.

Another object of the disclosure is to provide a charging system, a device for charging earphones while the earphones are in use, process, and method of use that utilizes a global positioning system.

Yet another object of the disclosure is to provide a charging system, a device for charging earphones while the earphones are in use, process, and method of use that provides alerts.

Another object of the disclosure is to provide a charging system, a device for charging earphones while the earphones are in use, process, and method of use that tracks historical data.

Another object of the disclosure is to provide a charging system, a device for charging earphones while the earphones are in use, process, and method of use that are easy to connect with other devices.

Yet another object of the disclosure is to provide a charging system, a device for charging earphones while the earphones are in use, process, and method of use that works with various digital platforms.

Another object of the disclosure is to provide a charging system, a device for charging earphones while the earphones are in use, process, and method of use that provides a user interface; displaying battery level and the like.

Yet another object of the disclosure is to provide a charging system, a device for charging earphones while the earphones are in use, process, and method of use that is quick and efficient.

Another object of the disclosure is to provide a charging system, a device for charging earphones while the earphones are in use, process, and method of use that is easy to program to a predetermined set of rules.

Yet another object of the disclosure is to provide a charging system, a device for charging earphones while the earphones are in use, process, and method of use that is robust.

Another object of the disclosure is to provide a charging system, a device for charging earphones while the earphones are in use, process, and method of use that saves time for a user.

Yet another object of the disclosure is to provide a charging system, a device for charging earphones while the earphones are in use, process, and method of use that prevents down periods and/or durations of time for which a user cannot directly engage with earphones as the earphones are being charged.

Another object of the disclosure is to provide a charging system, a device for charging earphones while the earphones are in use, process, and method of use that are high quality.

These and other objects, features, or advantages of the present disclosure will become apparent from the specification and claims.

BRIEF DESCRIPTION OF THE DRAWINGS

The drawings accompanying and forming part of this specification are included to depict certain aspects of the disclosure.

DETAILED DESCRIPTION OF THE DISCLOSURE

Figure 1:
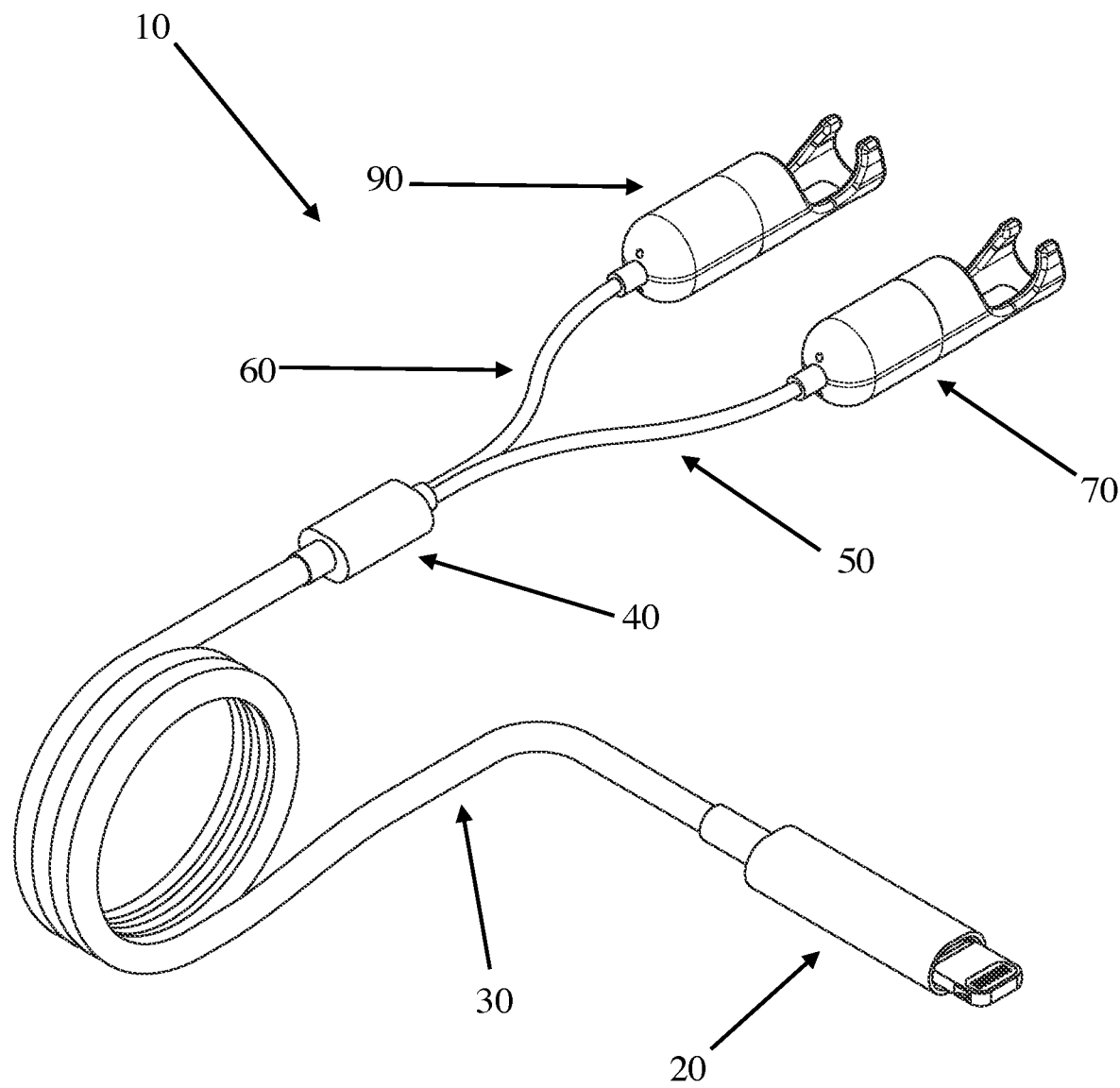
FIG. 1 is a top, perspective view of a charging system, a device for charging earphones while the earphones are in use; the view showing a plug; the view showing a main cable; the view showing a splitter; the view showing a first charger cable; the view showing a first charger; the view showing a second charger cable; the view showing a second charger.
Figure 2:
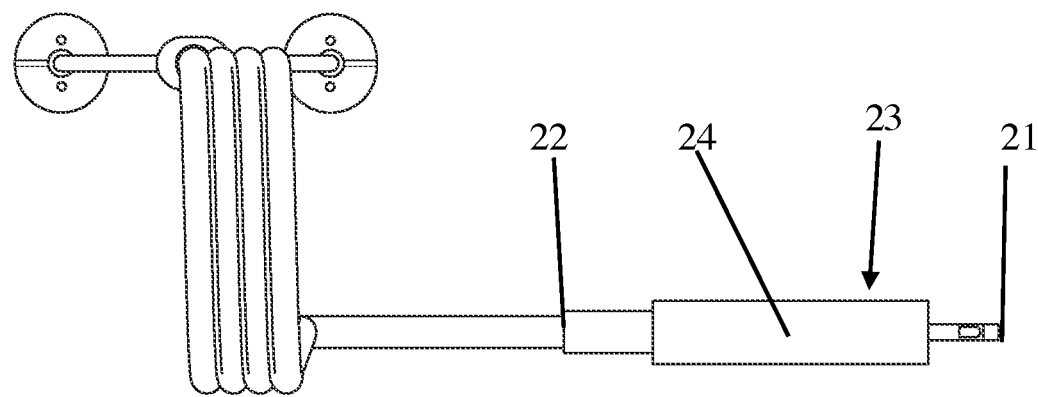
FIG. 2 is a bottom view of a charging system, a device for charging earphones while the earphones are in use; the view showing a plug; the view showing a main cable; the view showing a splitter; the view showing a first charger cable; the view showing a first charger; the view showing a second charger cable; the view showing a second charger.
Figure 3:
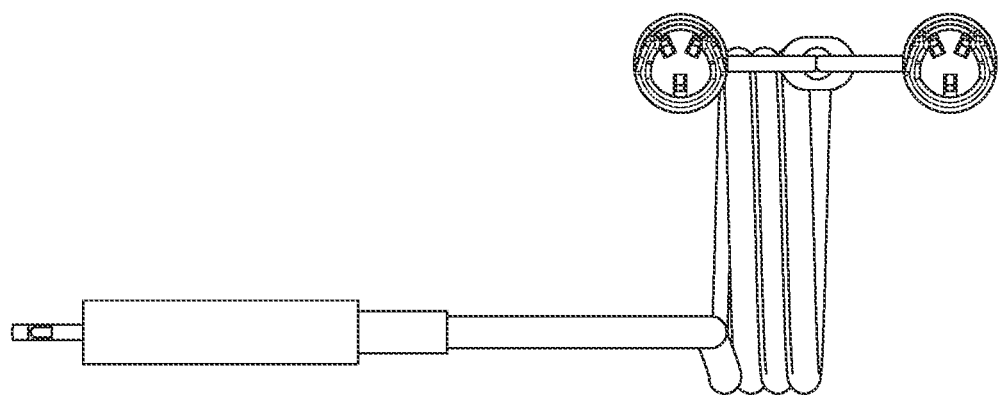
FIG. 3 is a top view of a charging system, a device for charging earphones while the earphones are in use; the view showing a plug; the view showing a main cable; the view showing a splitter; the view showing a first charger cable; the view showing a first charger; the view showing a second charger cable; the view showing a second charger.
Figure 4:
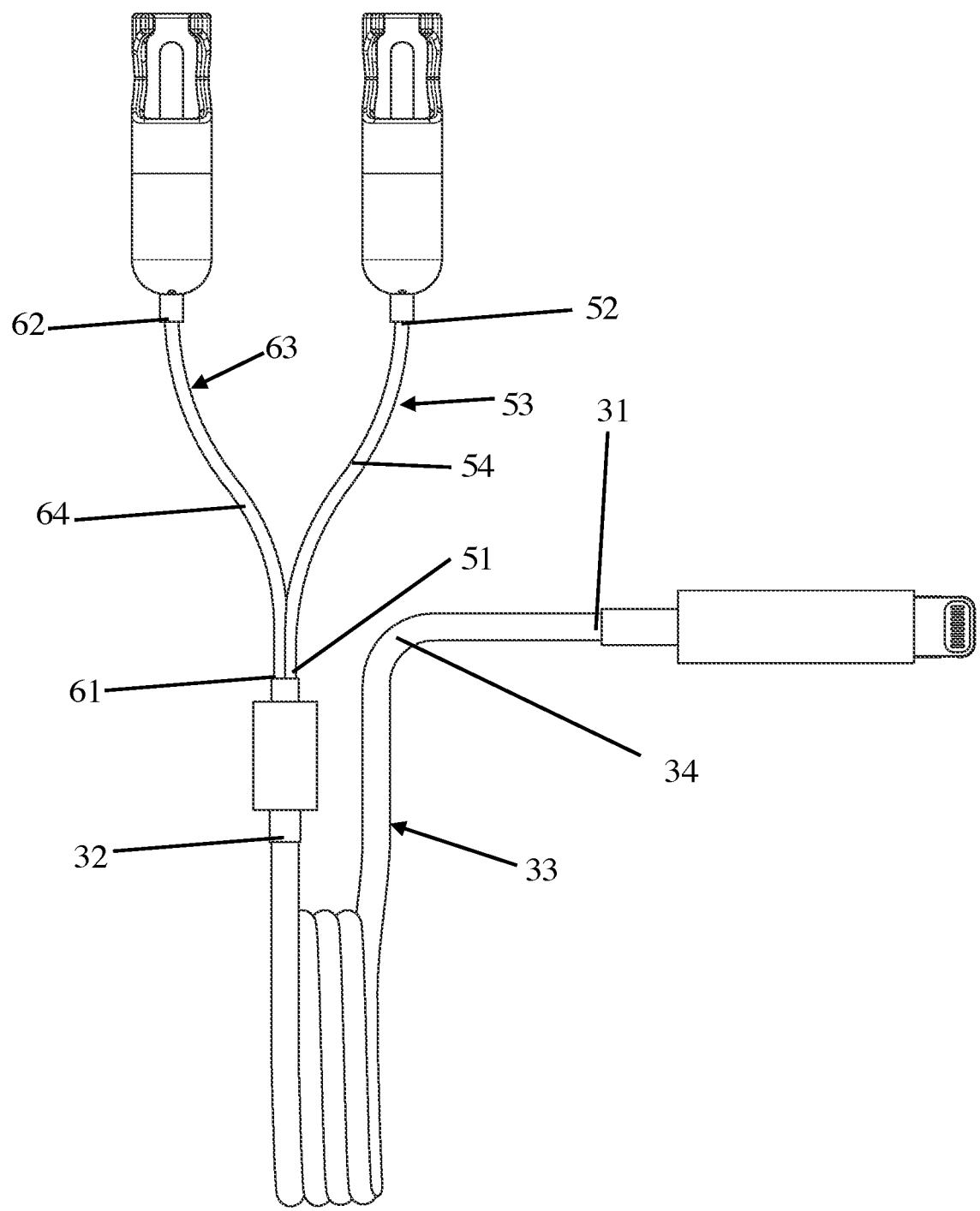
FIG. 4 is a front view of a charging system, a device for charging earphones while the earphones are in use; the view showing a plug; the view showing a main cable; the view showing a splitter; the view showing a first charger cable; the view showing a first charger; the view showing a second charger cable; the view showing a second charger.
Figure 5:
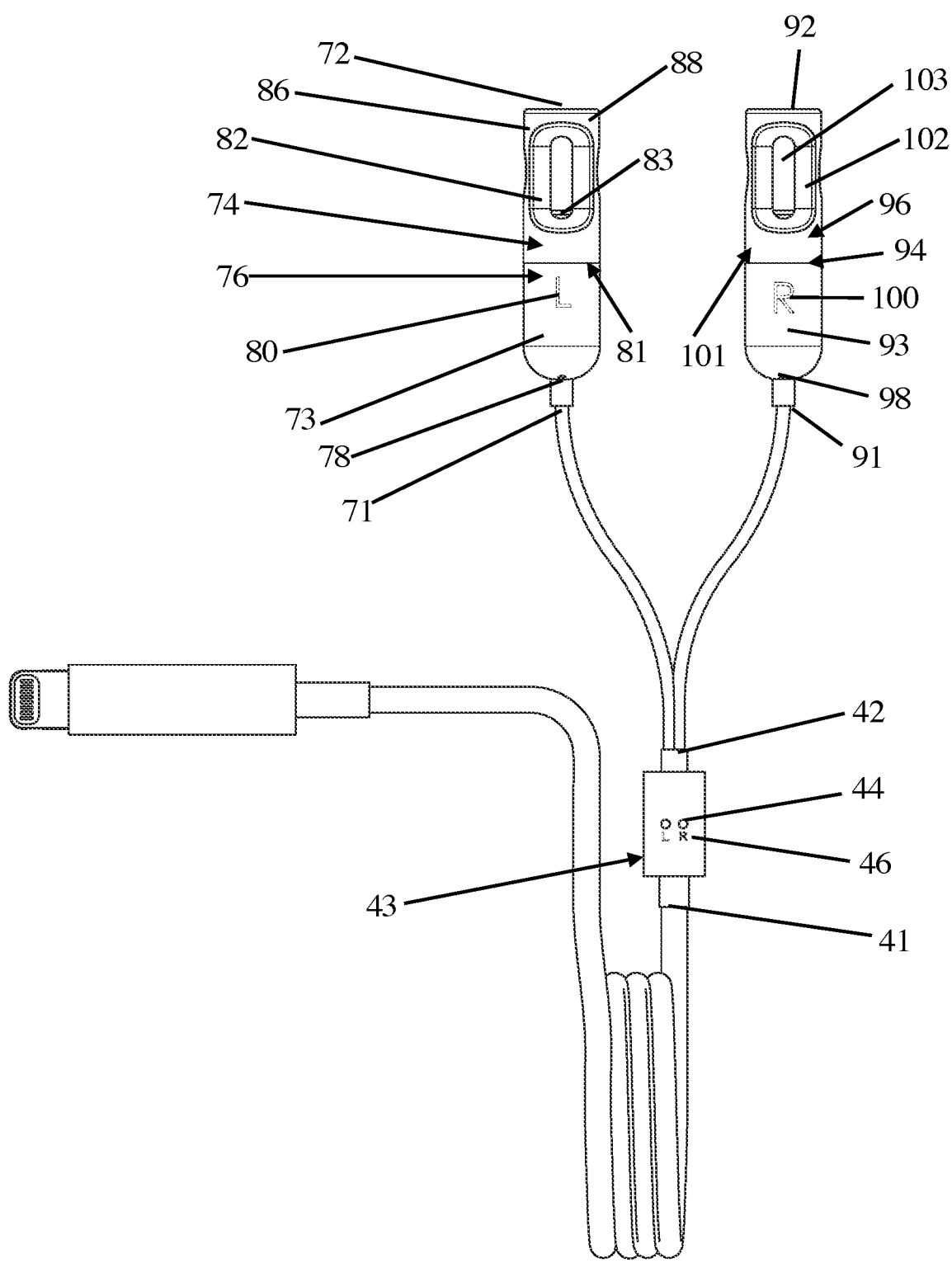
FIG. 5 is a rear view of a charging system, a device for charging earphones while the earphones are in use; the view showing a plug; the view showing a main cable; the view showing a splitter; the view showing a first charger cable; the view showing a first charger; the view showing a second charger cable; the view showing a second charger.
Figure 6:
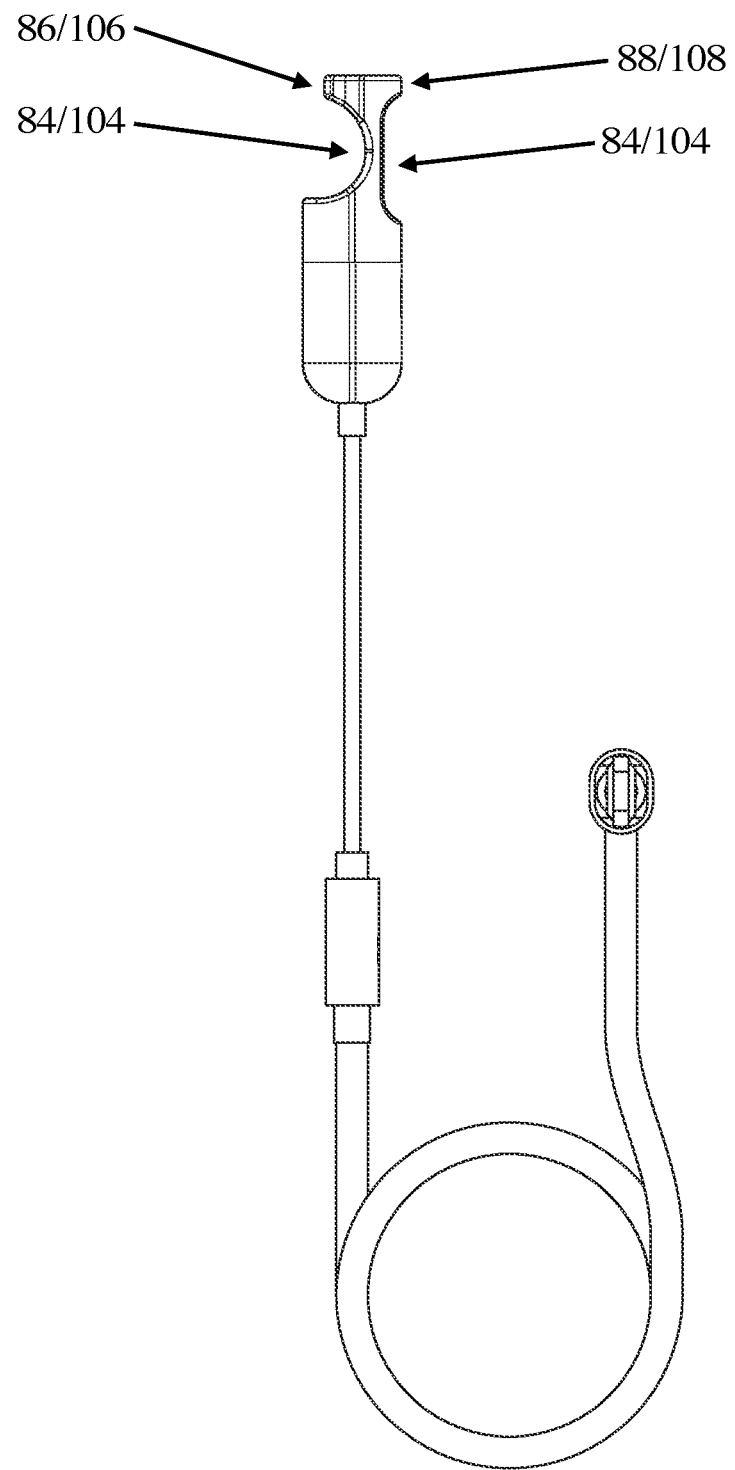
FIG. 6 is a side view of a charging system, a device for charging earphones while the earphones are in use; the view showing a plug; the view showing a main cable; the view showing a splitter; the view showing a first charger cable; the view showing a first charger; the view showing a second charger cable; the view showing a second charger.
Figure 7:
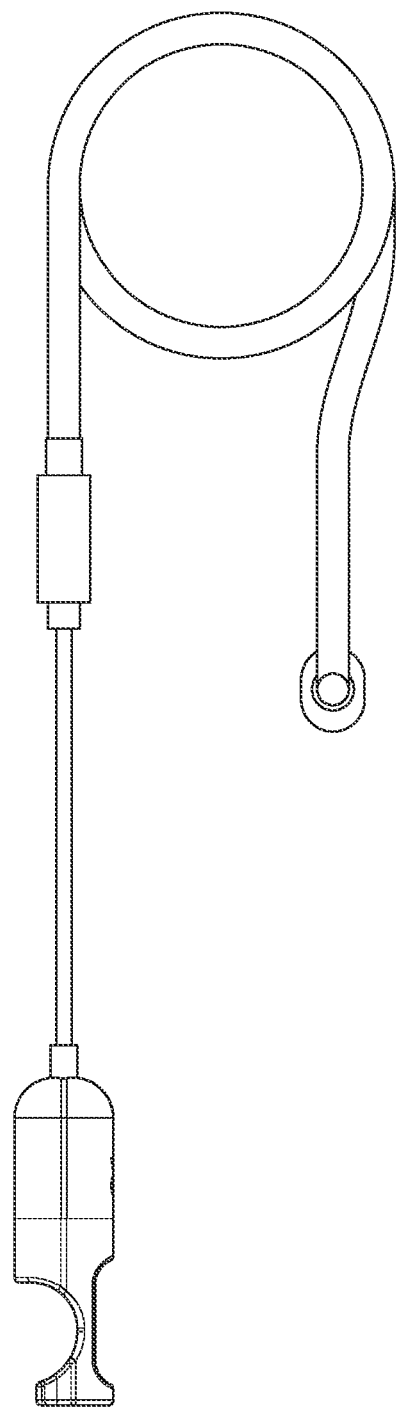
FIG. 7 is a side view of a charging system, a device for charging earphones while the earphones are in use; the view showing a plug; the view showing a main cable; the view showing a splitter; the view showing a first charger cable; the view showing a first charger; the view showing a second charger cable; the view showing a second charger.
Figure 8:
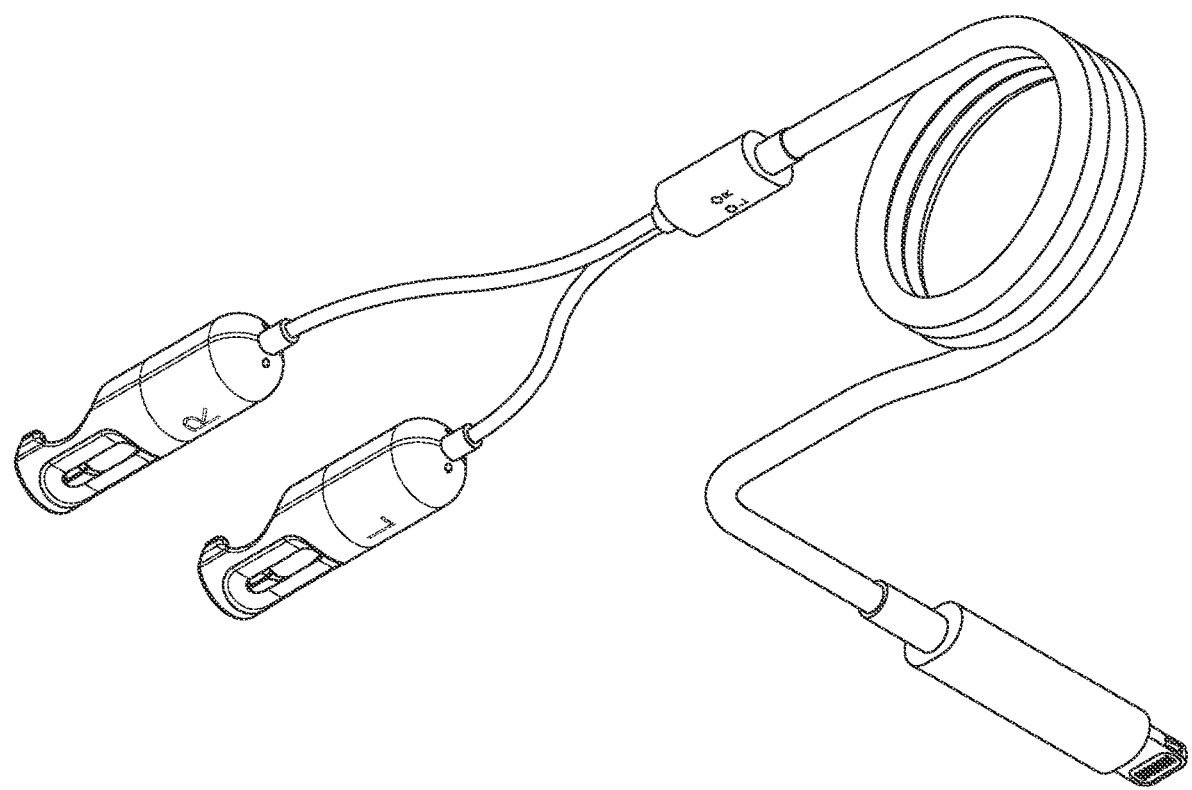
FIG. 8 is a rear, perspective view of a charging system, a device for charging earphones while the earphones are in use; the view showing a plug; the view showing a main cable; the view showing a splitter; the view showing a first charger cable; the view showing a first charger; the view showing a second charger cable; the view showing a second charger.
Figure 9:
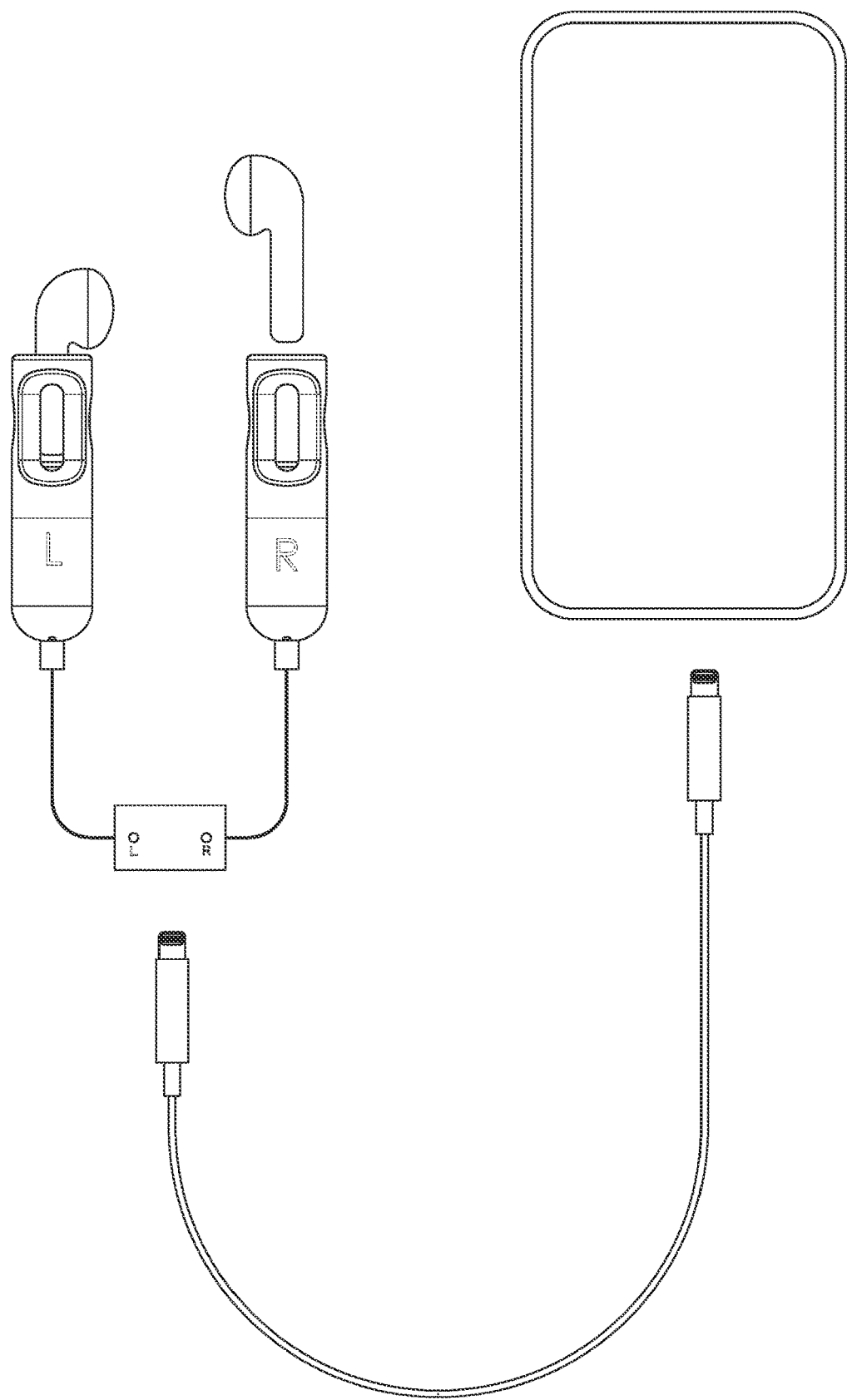
FIG. 9 is a front view of a charging system, a device for charging earphones while the earphones are in use; the view showing a smart device; the view showing ear buds; the view showing a first ear bud inserted into the charging system; the view showing a plug; the view showing a main cable; the view showing a splitter; the view showing a first charger cable; the view showing a first charger; the view showing a second charger cable; the view showing a second charger.
Figure 10:
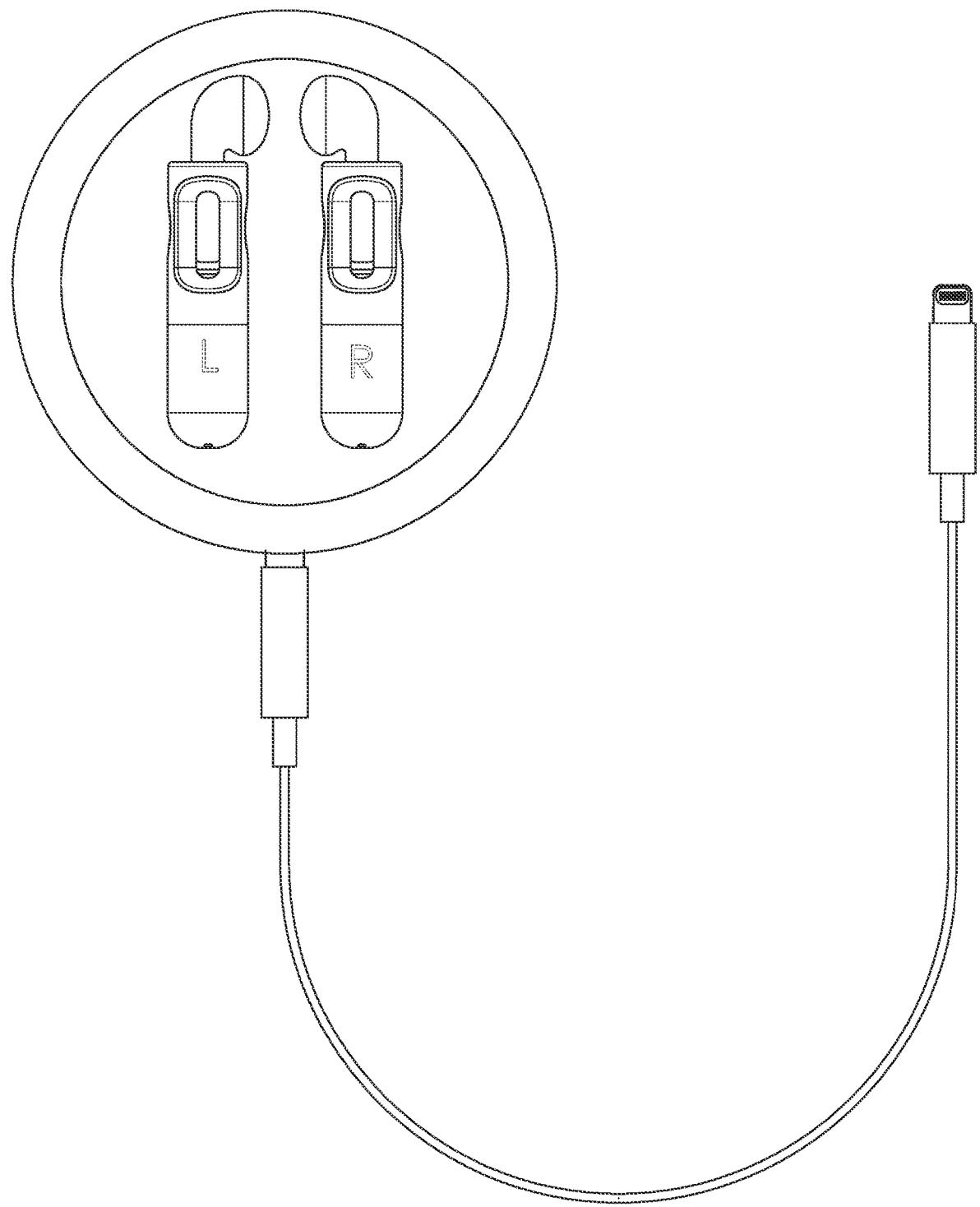
FIG. 10 is a rear, perspective view of a charging system, a device for charging earphones while the earphones are in use; the view showing a charging plate; the view showing earbuds inserted into the charging system; the view showing a plug; the view showing a main cable; the view showing a splitter; the view showing a first charger cable; the view showing a first charger; the view showing a second charger cable; the view showing a second charger.
Figure 11:
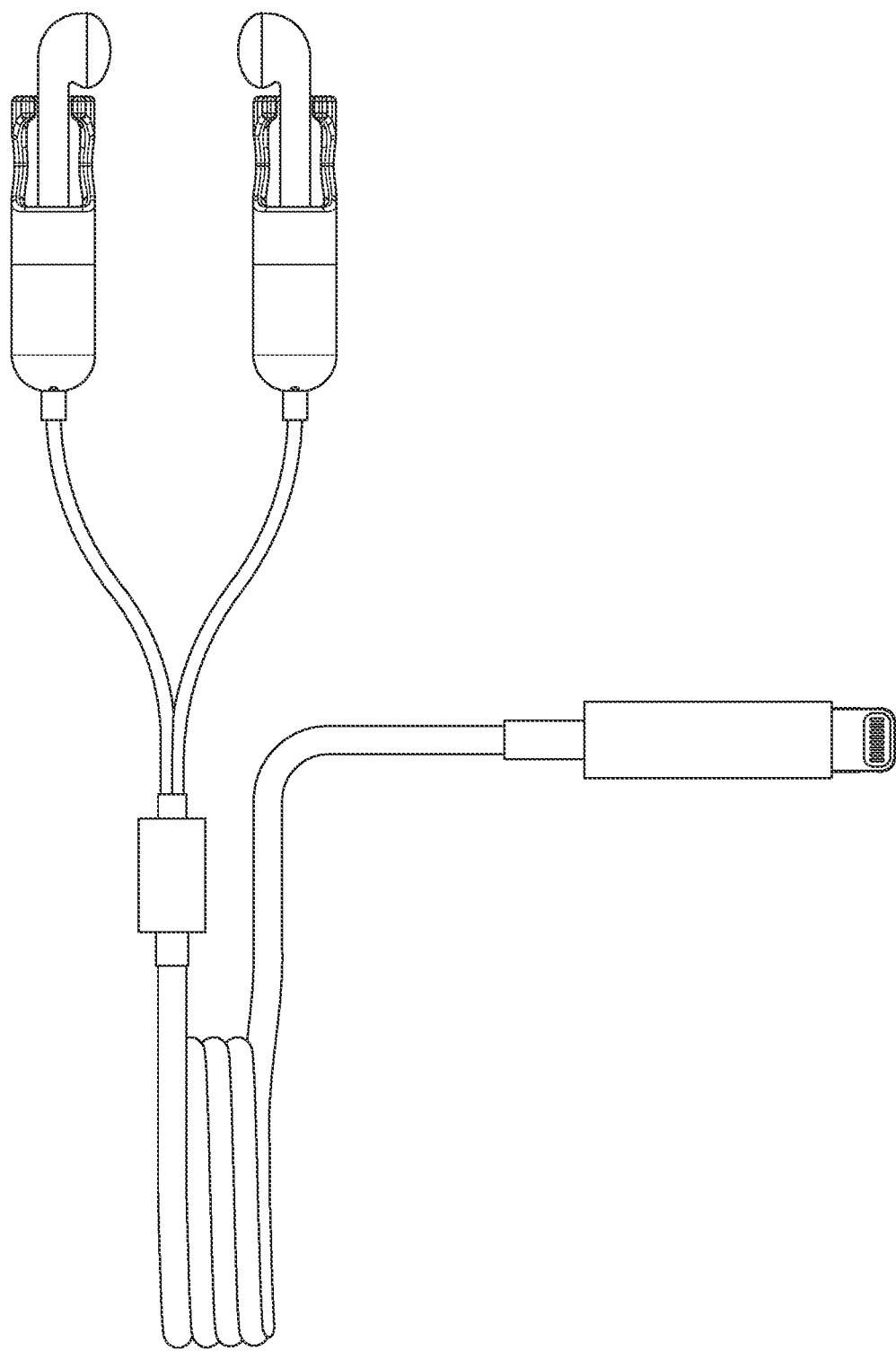
FIG. 11 is a rear, perspective view of a charging system, a device for charging earphones while the earphones are in use; the view showing earbuds; the view showing a plug; the view showing a main cable; the view showing a splitter; the view showing a first charger cable; the view showing a first charger; the view showing a second charger cable; the view showing a second charger.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure (s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the disclosure.

Reference throughout this specification to "one embodiment," "an embodiment," "one example," or "an example" means that a particular feature, structure, or characteristic described in connection with the embodiment or example is included in at least one embodiment of the present disclosure. Thus, the appearance of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium.

Any combination of one or more computer-usable or computer-readable media may be utilized. For example, a computer-readable medium may include one or more of a portable computer removable drive, a hard disk, a random access memory (RAM) device, a read-only memory (ROM) device, an erasable programmable read-only memory (EE-PROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code, or virtual code, or framework code suitable for the disclosure herein, or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("Saas"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

System:

With reference to the figures, a charging system, a device for charging earphones while the earphones are in use, process, and method of use 10 are presented. a charging system, a device for charging earphones while the earphones are in use, process, and method of use 10 (hereafter referred to as "wireless charging system", "earphone charging system", "in-use power supply", "charging system", or simply "system") is formed of any suitable size, shape and design.

In the arrangement shown, as one example, the main structure of system 10 includes a plug 20, a primary cable 30, a splitter 40, a first charger cable 50, a second charger cable 60, a first charger 70, and a second charger 90, a plurality of attachments, a plurality of wired connections, and communication and control components, among other components, features, and functionality.

In the arrangement shown, as one example, system 10 is configured to provide a wireless, magnetic-induction charging cable for charging and/or recharging headphones and/or wireless headphones and/or earphones. In the arrangement shown, as one example, system 10 is generally configured of a cable having two ends. One end, a plug end (to be further described herein), accepts power from a power source. This end may be formed of a USB-C type connection, a Thunderbolt® connection, Lighting™, or the like. The charging end is configured with two magnetic tips, which connect and accept wireless headphones therein, such as Airpods®, for example. Another example, and in an alternative embodiment, the charging end is configured to accept with close and tight tolerances, as well as through magnetic securement, Pixel Buds® for charging through inductance. Furthermore, and in the arrangement shown as one example, the present disclosure is configured and designed such that the system 10 can attach to earphones either by magnetic force, or mechanical engagement. Said yet another way, system 10 can secure for charging earphones by engaging with close and tight tolerance the shape of the earphones. This prevents the earphones from moving around and/or becoming disengaged with charging connectivity even while the earphones are charging and/or in use.

Furthermore, and in the arrangement shown as one example, system 10 is configured to charge and/or recharge earphones of a user while the earphones are in use. Said another way, system 10 is configured to provide charge to wireless headphones while the wireless headphones are being used by a user for calls, entertainment, commuting, and the like. System 10 provides an alternative to carrying cases and/or charging cases, increasing the usability and effectiveness of wireless earphones.

Said another way, and as one example of one embodiment, system 10 is configured as a wireless, magnetic-induction charging cable which provides power and/or recharges and/or charges wireless headphones and/or wireless earphones and/or wireless ear buds. In this example, system 10 is configured as a cable having two ends. One end of the cable receiving power from a power source, plugging into various adaptations such as a USB-C connection and/or Thunderbolt™ connection. The charging end, in this example, includes two magnetic tips which connect to each of the wireless headphones. In this way, a user can utilize headphones while the headphones are charging instead of placing the headphones in a case and/or carrying case. This extends the useful life of headphones and provides for an ongoing and/or indefinite use of the headphones.

In another example, the chargers include a plurality of onboard rechargeable batteries so that the system does not need to be connected to a power source to operate. Furthermore, in one embodiment, the support and/or apertures for accepting earphones is formed of a soft but sturdy enough material to accept a variety of shapes and sizes of earphones. In this way, various types, shapes, and sizes of earphones can be utilized within the same system 10. Furthermore, in one embodiment, the polarities of the magnets are configured to appropriately align an inserted earphone such that the earphone will securely attach and attach in the correct orientation to initiate and/or transmit charging. Furthermore, and in this way, system 10 includes differentiation between earphone types. System 10 includes a processor, detection features, and the like to determine the type of earphones such that the correct charge rate and type of charge can be delivered, preventing damage and optimizing charge levels for various types of earphones. Said another way, one embodiment of the present disclosure is designed and configured to accept various models of Airpods™. In another embodiment of the present disclosure, the design is configured to accept various models of Pixel Buds™. In yet another embodiment, the design of the present disclosure is configured to accept other models of wireless headphones. In yet another embodiment, the design of the present disclosure is configured to accept other models of wireless headphones of a relatively similar shape and size.

Additionally, as another example, system 10 may comprise computing capabilities. These components may include remote servers, databases, application servers, application databases, product databases, mobile applications, and/or computers; all of which in continuity or as separate acts fulfill the functions disclosed herein. System 10 may also include, in the embodiments depicted, a user, a graphical user interface, a smart device, a smart phone, a portable power supply, a power source, a wall plug, earphones, a case, a charging case, a sensor system—for determining earphone engagement, a sensor system—for determining user engagement and environmental factors, a computing system, a communication and/or control system, an application server, and a mobile computing application, among other components, features, and functions.

User (or Plurality Thereof):

In the arrangement shown, as one example, system 10 includes a user. User may be any user interacting with or utilizing the system 10. This may include viewing, controlling, analyzing, manipulating, and/or interacting with system 10. User is not limited to a single user but may be a plurality of users.

Smart Device:

In the arrangement shown, as one example, system 10 may also include a smart device (also referred to as "device", "smartphone", "electronic device", "wearable", or simply "phone"). Smartphone is formed of any suitable size, shape, and design, and is configured to provide various services to a user such as the time, phone services, music playback, video streaming, heart monitoring, and other configurations.

Smart devices vary greatly in size, shape, and function. Some smart devices such as smart watches also provide phone services, texting, gps, and the like. Smart device is not limited to a particular smart watch or wearable system but is a device which can be charged through corded connection and/or inductive charging.

Said another way, and in the arrangement shown, as one example, system 10 may include a smart device. Smart device is formed of any suitable size, shape, and design and is configured to serve as an interface between the attractor and the user.

In this way, and as is shown in one embodiment, smart device is included and configured to serve as a display screen and interaction feature. This may include, but is not limited to, programming graphical user interface, previewing images and/or data to be captured, modifying data which has been captured, viewing data which has been captured, entering data, manipulating the devices via zoom and other functionality, modifying other settings of the hardware components, and the like.

Furthermore, and in the arrangement shown, as one example, the smart device is also configured to act as a potential power supply for system 10, and the like. As one example, a smart device is formed of a smart phone. However, other smart devices are also hereby contemplated for use, such as but not limited to, tablets, desktop computers, laptop computers, smart chargers, portable rechargeable battery systems, other power sources, and the like.

Power Source:

In the arrangement shown, as one example, spanner tool system 10 includes a power supply (also known as a "smart device battery", a "power source", an "energy supply", a "battery", a "plurality of batteries", or simply a "charge"). Energy supply is formed of any suitable size, shape, and design and is configured to provide energy to the system 10. Power supply in the arrangement shown, does not move such as other mechanical components of the system may "move". Instead energy supply is configured as a source of energy for the charging of earphones and the like (to be further discussed herein).

In the arrangement shown, as one example, power supply is formed of a rechargeable battery. The rechargeable battery, or storage battery, is an electrical battery designed to be charged, discharged, and recharged as many times as needed, as opposed to a disposable or primary battery, which is disposed of after use. However, a primary battery or disposable battery is also hereby contemplated for use. The rechargeable battery, in the arrangement shown, is formed of one or more electrochemical cells. In the arrangement shown, as one example, power supply is formed of a rechargeable battery. However, the power supply may also consist of a plurality of rechargeable batteries and/or a plurality of batteries. Furthermore, this power source may be onboard, in a smartphone, or carried as a separate, stand-alone device.

In the arrangement shown, as one example, the power supply may also be formed of other power types and/or generators including, but not limited to solar power supply. Furthermore, in the arrangement shown, power supply may also include all necessary components, whether wires, conductors, cases, holders, and the like which provide for necessary connections and stabilization for power supply 14 components.

Headphones:

In the arrangement shown, as one example, system 10 may include earphones (also referred to as "ear phones", "ear buds", "headphones", "head phones", or simply "pods"). Pods is formed of any suitable size, shape, and design, and is configured to play music and/or audio to a user. Similarly, pods are configured, typically, with a microphone for receiving audio feedback from a user and/or environment.

In the arrangement shown, as one example, earphones are generally sized and shaped to fit into the system 10, as is further described herein. In this way, the earphones can be charged while the earphones are being used. In the arrangement shown, as one example, the earphones may have magnetic features for securing in place and/or may fit within close or tight tolerances so as to fit securely in the charging station (to be further described herein).

Case:

In the arrangement shown, as one example, system 10 may also include a case (also referred to as "storage case", "charging case", or simply "case"). Case is formed of any suitable size, shape, and design, and is configured to store and hold system 10. In this way, system 10 can be conveniently stored in an organized and safe fashion when not in use so as for storage and/or transportation of system 10 and accompanying components.

Case may also include a power supply of its own which can recharge and/or deliver charge to system 10 when system 10 is being stored within the case. In this way, case may include a plurality of rechargeable batteries, and the like.

Charging System:

Plug:

In the arrangement shown, as one example, system 10 includes a plug 20 (also referred to as "power connection", "power plug", or simply "plug"). Plug 20 is formed of any suitable size, shape, and design, and is configured to provide power entry and/or charge and conductance to enter the system. Said another way, plug 20 is configured to plug into a power source such as a smart phone and/or wall plug and/or battery and/or battery pack, a combination thereof, and the like.

In the arrangement shown, as one example, plug 20 extends a length from a first end 21 (a plug end) to a second end 22. Furthermore, and in the arrangement shown as one example, plug 20 also includes a converter 23 and a cover 24.

In the arrangement shown, as one example, plug 20 includes a converter 23. Converter 23 is configured to convert energy to a safe and desirable charge level, frequency, current, a combination thereof, and the like. In some cases, this may be for a conversion which is safe for the particular earphones and the like. In one embodiment, the converter can be switched and/or adjusted for optimization of levels with a particular brand of headphones, earphones, and the like.

Primary Cable:

In the arrangement shown, as one example, system 10 includes a primary cable 30 (also referred to as "main cable", "primary conductor", or simply "cable"). Main cable 30 is formed of any suitable size, shape, and design, and is configured to provide safe conductance in an aesthetically pleasing manner.

In the arrangement shown, as one example, main cable 30 extends a length from a first end 31 (an end connected to the plug 20) to a second end 32 (or diverter end, to be further described herein). The main cable 30 includes a conductor 33 with an insulator and cover 34. In the arrangement shown, as one example, the conductor 33 provides conductance and/or charge delivery through system.

In the arrangement shown, as one example, main cable 30 may also include various cables, wires and the like for transmitting signals, communication, such as antennas and more.

Splitter:

In the arrangement shown, as one example, system 10 includes a splitter 40 (also referred to as "diverter", "Y-junction", or simply "splitter"). Y-junction 40 is formed of any suitable size, shape, and design, and is configured to provide two separate lines of transmission for power conductance and other information. Said another way, splitter 40 is configured to split the main cable and provide other indications based on different information received at the location of the splitter 40 related to various information of system 10.

In the arrangement shown, as one example, the splitter 40 extends a length from a first end 41 (the cable end) to a second end 42 (split end). Splitter 40 includes a plurality of conductors 43 and indicators 44. Furthermore, and in the arrangement shown, as one example, splitter 40 includes a plurality of labels 46 which associate with indicators 44 to provide information to a user and the like.

In the arrangement shown, as one example, splitter 40 may also include an onboard power source. Said another way, splitter 40 may include a plurality of batteries onboard and/or a plurality of rechargeable batteries, such that the splitter delivers charge for recharging earphones. In this way, the plurality of batteries within the splitter 40 can be charged and/or recharged as is convenient for a user.

First Charger Cable:

In the arrangement shown, as one example, system 10 includes a first charger cable 50 (also referred to as "charger cable", "plurality of charger cables", or simply "charge cable"). First charger cable 50 is formed of any suitable size, shape, and design, and is configured to connect the diverter to the first charger (to be further described herein).

In the arrangement shown, as one example, first charger cable 50 extends a length from a first end 51 (a splitter end) to a second end 52 (a charger end). The first charger cable 50 includes a conductor 53 and a cover 54. In the arrangement shown, as one example, the conductor 53 provides conductance and/or charge delivery through system.

In the arrangement shown, as one example, first charger cable 50 may also include various cables, wires and the like for transmitting signals, communication, such as antennas and more. First charger cable 50 may also include an extender and a coil so as to easily wind and store the first charger cable 50.

Second Charger Cable:

In the arrangement shown, as one example, system 10 includes a second charger cable 60 (also referred to as "charger cable", "plurality of charger cables", or simply "charge cable"). Second charger cable 60 is formed of any suitable size, shape, and design, and is configured to connect the diverter to the second charger (to be further described herein).

In the arrangement shown, as one example, second charger cable 60 extends a length from a first end 61 (a splitter end) to a second end 62 (a charger end). The second charger cable 60 includes a conductor 63 and a cover 64. In the arrangement shown, as one example, the conductor 63 provides conductance and/or charge delivery through system.

In the arrangement shown, as one example, second charger cable 60 may also include various cables, wires and the like for transmitting signals, communication, such as antennas and more. Second charger cable 60 may also include an extender and a coil so as to easily wind and store the second charger cable 60.

First Charger:

In the arrangement shown, as one example, system 10 includes a first charger 70 (also referred to as "inductor", "earphone connection", or simply "charger"). First charger 70 is formed of any suitable size, shape, and design, and is configured to charge an earphone and/or charge an earphone while the earphone is in use.

In the arrangement shown, as one example, the first charger 70 extends a length from a first end 71 (cable end) to a second end 72—having a main body 73 and a hollow interior 74 with an exterior surface 76. Furthermore, and in the arrangement shown, as one example first charger 70 includes a plurality of indicators 78. The plurality of indicators may be led lights of varying colors and color changeability. The indicators may include an display screen for conveying and/or receiving information to and/or from a user. Furthermore, in the arrangement shown, as one example, first charger cable 70 may also include a plurality of labels 80—such as a left label and a right label.

Furthermore, and in the arrangement shown, as one example, first charger 70 may also include various cables, wired connections 81, a plurality of wires, a plurality of batteries, a plurality of rechargeable batteries, magnets, inductors, and the like which include transmitting signals, communication, such as antennas and more. In this way, the first charger may also include bluetooth, near field transmission features, capability, functionality and the like.

In the arrangement shown, as one example, first charger 70 may include a plurality of magnets 82. The plurality of magnets serve a variety of functions, including but not limited to, securing the earphone in place, aligning earphones for charging purposes, providing electrical and charging functionality, a combination thereof, and the like.

In the arrangement shown, as one example, first charger 70 also includes an inductor charger 83. Inductor is formed of any suitable size, shape, and design and is configured to transmit charging to the earphone. However, an inductor may not be the charge delivery depending on headphone type. The earphone and/or headphone may also receive charge by direct conductor contact with the plurality of contacts of the first charger.

In the arrangement shown, as one example, first charger 70 also includes a securement aperture 84 having a plurality of extensions such as a first extension arm 86 and a second extension arm 88. The first and second extension arms are configured to receive the earphone with close and tight tolerances while still enabling a user to utilize the headphone and/or earphone. The size, shape, and design may vary depending on the earphone type and shapes vary in size.

Second Charger:

In the arrangement shown, as one example, system 10 includes a second charger 90 (also referred to as "inductor", "earphone connection", or simply "charger"). Second charger 90 is formed of any suitable size, shape, and design, and is configured to charge an earphone and/or charge an earphone while the earphone is in use.

In the arrangement shown, as one example, the second charger 90 extends a length from a first end 91 (cable end) to a second end 92—having a main body 93 and a hollow interior 94 with an exterior surface 96. Furthermore, and in the arrangement shown, as one example first charger 90 includes a plurality of indicators 98. The plurality of indicators may be led lights of varying colors and color changeability. The indicators may include an display screen for conveying and/or receiving information to and/or from a user. Furthermore, in the arrangement shown, as one example, second charger cable 90 may also include a plurality of labels 100—such as a left label and a right label.

Furthermore, and in the arrangement shown, as one example, second charger 90 may also include various cables, wired connections 101, a plurality of wires, a plurality of batteries, a plurality of rechargeable batteries, magnets, inductors, and the like which include transmitting signals, communication, such as antennas and more. In this way, the first charger may also include bluetooth, near field transmission features, capability, functionality and the like.

In the arrangement shown, as one example, second charger 90 may include a plurality of magnets 102. The plurality of magnets serve a variety of functions, including but not limited to, securing the earphone in place, aligning earphones for charging purposes, providing electrical and charging functionality, a combination thereof, and the like.

In the arrangement shown, as one example, second charger 90 also includes an inductor charger 103. Inductor is formed of any suitable size, shape, and design and is configured to transmit charging to the earphone. However, an inductor may not be the charge delivery depending on headphone type. The earphone and/or headphone may also receive charge by direct conductor contact with the plurality of contacts of the first charger.

In the arrangement shown, as one example, second charger 90 also includes a securement aperture 104 having a plurality of extensions such as a first extension arm 106 and a second extension arm 108. The first and second extension arms are configured to receive the earphone with close and tight tolerances while still enabling a user to utilize the headphone and/or earphone. The size, shape, and design may vary depending on the earphone type and shapes vary in size.

Alternative Embodiment (Wired Charging Cable)

In another arrangement, and an alternative embodiment hereby contemplated for use, system 10 includes a wired charging cable. In this way, the earphones can snap into the Y-shaped cable. Similarly, the earphones can plug into a smart device such as an iphone, smart phone, computer, usb-c and the like. In this way, the earphones can be charged while in use. In one arrangement, the earphones are magnetically secured. In another arrangement, as described herein, this securement may be close and tight tolerances as a means of securement to enable charging and prevent slippage and/or mislocation of the earphones within the charging system 10.

Alternative Embodiment (Wireless Charging Cable)

In another arrangement, and an alternative embodiment hereby contemplated for use, system 10 includes a wireless charging cable. In this way, system 10 includes snapping and/or a snap feature in which the earphones snap into a U-shaped cable with a built in battery, thus no plug or the like is needed, but instead the battery and/or plurality of batteries and/or rechargeable battery and/or plurality of rechargeable batteries is onboard and/or built into system 10. IN this way, system 10 has an onboard power source. This extends the life of the earphones and can do so while in use.

Alternative Embodiment (Magnetic Charging Tips)

In another arrangement, and an alternative embodiment hereby contemplated for use, system 10 includes magnetic charging tips. In this way, earphones can be permanently and/or impermanently affixed to system 10. Said another way, a charging mat without wires may also be considered. Said another way, the system 10 may also charge via a charging mat and/or other means of inductive charging. In this way, the onboard power supply of system 10 can be charged and/or recharged via inductive charging or similar wireless charging.

In this way, the earphones and/or airpods stick togethers, such as when located in a pocket, a compartment, a case, and the like for easy storage and prevention of losing the earphones and the like. This also avoids cords, tangling, and the like.

Additional Benefits:

In addition to those mentioned herein, and said another way, system 10 offers the following benefits, although the benefits are not limited herein, charging while in use, visual indication when charging is needed, and/or charging is completed. This further enables a user to go wireless, remove earphones from chargers, attach earphones to chargers, and the like without losing power and/or disconnecting and/or stopping and/or pausing ongoing use of earphones. Furthermore, system 10 prevents downtime—in this way. Furthermore, spare headphones are not required when the primary headphones are charging or drained, etc.

Additionally, and said another way, the present disclosure provides an extra battery and/or extended battery life. Furthermore, the present disclosure extends the useful life of earphones since batteries may degrade over time since the present system can provide power on an ongoing basis. Furthermore, and said another way, the present disclosure provides automatic and/or detection upon connection. Once detected, system 10 determines the type of earphone and optimizes charge levels and various charging parameters to optimize battery charging speed and/or battery life, depending on the desired settings of the user.

Furthermore, and in the arrangement shown, as one example, system 10 includes easy charging. Said another way, various charging possibilities in various circumstances are provided herein.

Graphical User Interface:

In the arrangement shown, as one example, system 10 may include a graphical user interface. Graphical user interface is formed of any suitable size shape and design and is configured to allow a user to view interact with, manipulate, and visually access system data and information, information related thereto, and/or view various data for various environments and/or add information to system and/or environment and/or change the settings of the sensors and/or change the settings of operation.

Display of Graphical User Interface: In an alternative embodiment, system 10 includes a graphical user interface. Graphical user interface may also include a display, which is configured to show and display information, including data, for review and interpretation by a user or plurality of users, or a plurality of users interacting with one another.

In the arrangement shown, as one example, and/or in an alternative embodiment, system 10 may include a plurality of graphical user interfaces for each charger, and the like.

Computing Platform:

In another alternative embodiment, as one example, system 10 may include a computing platform and/or onboard computing platform and/or remote computing platform (or "computer", or "computer platform"). Computing platform is formed of any suitable size, shape, and design and is configured to provide computing support, power, and computing processing for both onboard computing functionality as well as communication for off-board or server computing functionality. In this way, an onboard computing system, among other components and features on top of the platform.

Sensor System:

In another alternative embodiment, as one example, system 10 includes a sensor system. Sensor system is formed of any suitable size, shape, and design and may include one or more sensors and/or one or more sensing technologies. In the arrangement shown, as one example, sensor system is configured to detect and communicate information related to system 10 as well as the surroundings and/or environment of system; such as when earphones have been placed and/or accepted into a location of charging, such as when the plug has been placed to a power source, a combination thereof, and the like.

Application Server:

In another alternative embodiment, as one example, system 10 may comprise remote servers, databases, and/or computers that fulfill the functions disclosed and described herein. Application server may comprise one or more computer systems adapted to transmit and receive data regarding selected datasets related to various users and/or datasets related to multiple users. Application server is adapted to query databases, and may utilize unique identification codes, to retrieve information and associated information related to system 10.

In addition to the above identified features, options, controls, and components, system 10 may also include other features and functionalities, among other options, controls, and components.

It will be appreciated by those skilled in the art that other various modifications could be made to the system, process, and method of use without parting from the spirit and scope of this disclosure. All such modifications and changes fall within the scope of the claims and are intended to be covered thereby.

What is claimed:

1. A charging system, comprising:
   a plug;
      the plug extending a length from a first end to a second end;
      the plug having a converter;
      the plug having a cover;
   a primary cable;
      the primary cable extending a length from a first end to a second end;
      the primary cable having a conductor;
      the primary cable having a cover;
   a splitter;
      the splitter extending a length from a first end to a second end;
      the splitter having a plurality of conductors;
   a first charger cable;
      the first charger cable extending a length from a first end to a second end;
      the first charger cable having a conductor;
      the first charger cable having a cover;
   a second charger cable;
      the second charger cable extending a length from a first end to a second end;
      the second charger cable having a conductor;
      the second charger cable having a cover;
   a first charger;
      the first charger extending a length from a first end to a second end;
      the first charger having a main body;
      the first charger having a hollow interior;
      the first charger having an exterior surface;
      the first charger having a securement aperture;
         wherein the first charger is configured to deliver an electrical current, thereby recharging a first earphone while the second earphone is in use;
   a second charger;
      the second charger extending a length from a first end to a second end;
      the second charger having a main body;
      the second charger having a hollow interior;
      the second charger having an exterior surface;
      the second charger having a securement aperture;
         wherein the second charger is configured to deliver an electrical current, thereby recharging a second earphone while the second earphone is in use.

2. The system of claim 1, further comprising:
   a smart device;
      wherein the smart device is a smart phone.

3. The system of claim 1, further comprising:
a smart device;
  wherein the smart device is a tablet.
4. The system of claim 1, further comprising:
a power source.
5. The system of claim 1, further comprising:
a power source;
  wherein the power source is selected from a group consisting of: a smart phone, a tablet, the battery of a smartphone, the battery of a table, an onboard rechargeable battery, a charging case, a wall socket, a desktop computer, a laptop computer;
  wherein the power source provides a supply of electrical charge.
6. The system of claim 1, further comprising:
a plurality of earphones.
7. The system of claim 1, further comprising:
a case;
  the case having an onboard plurality of batteries;
  the case having a plurality of inductors;
  the case having a charge port;
  the case having an interface;
  the case having a plurality of indicators.
8. The system of claim 1, further comprising:
the plug having an adaptor; wherein the plug is configured to plug into an adaptor.
9. The system of claim 1, further comprising:
the splitter having a plurality of indicators;
the splitter having a plurality of labels.
10. The system of claim 1, further comprising:
the first charger having a plurality of indicators;
the first charger having a plurality of labels;
the first charger having a plurality of wired connections;
the first charger having a plurality of magnets;
the first charger having at least one induction charger;
the first charger having a first extension;
the first charger having a second extension.
11. The system of claim 1, further comprising:
wherein the first charger includes a relatively soft material for accepting different types of earphones having different shapes and sizes, within close and tight tolerances.
12. The system of claim 1, further comprising:
the second charger having a plurality of indicators;
the second charger having a plurality of labels;
the second charger having a plurality of wired connections;
the second charger having a plurality of magnets;
the second charger having at least one induction charger;
the second charger having a first extension;
the second charger having a second extension.
13. The system of claim 1, further comprising:
wherein the first charger includes a relatively soft material for accepting different types of earphones having different shapes and sizes, within close and tight tolerances.
14. The system of claim 1, further comprising:
a computing platform;
  the computing platform having a detection system;
    wherein the detection system is configured to detect when an earphone has been inserted into either the first charger or the second charger;
  the computing platform having a processor;
  the computing platform having a memory;
  the computing platform having a graphical user interface;
    the graphical user interface having a display;
    wherein the display of the graphical user interface provides information and interactions related to the system.
15. The system of claim 1, further comprising:
a sensing system;
  the sensing system having a plurality of sensors.
16. The system of claim 1, further comprising:
an application server.
17. An earphone charging system, comprising:
a plug;
  the plug extending a length from a first end to a second end;
  the plug having a converter;
  the plug having a cover;
  the plug having an adaptor; wherein the plug is configured to plug into an adaptor;
a primary cable;
  the primary cable extending a length from a first end to a second end;
  the primary cable having a conductor;
  the primary cable having a cover;
a splitter;
  the splitter extending a length from a first end to a second end;
  the splitter having a plurality of conductors;
  the splitter having a plurality of indicators;
  the splitter having a plurality of labels;
a first charger cable;
  the first charger cable extending a length from a first end to a second end;
  the first charger cable having a conductor;
  the first charger cable having a cover;
a first charger;
  the first charger extending a length from a first end to a second end;
  the first charger having a main body;
  the first charger having a hollow interior;
  the first charger having an exterior surface;
  the first charger having a plurality of indicators;
  the first charger having a plurality of labels;
  the first charger having a plurality of wired connections;
  the first charger having a plurality of magnets;
  the first charger having at least one induction charger;
  the first charger having a securement aperture;
  the first charger having a first extension;
  the first charger having a second extension;
    wherein the first charger is configured to deliver an electrical current, thereby recharging a first earphone;
a computing platform;
  the computing platform having a processor;
  the computing platform having a memory.
18. The system of claim 17, further comprising:
a second charger cable;
  the second charger cable extending a length from a first end to a second end;
  the second charger cable having a conductor;
  the second charger cable having a cover;
a second charger;
  the second charger extending a length from a first end to a second end;
  the second charger having a main body;
  the second charger having a hollow interior;
  the second charger having an exterior surface;
  the second charger having a plurality of indicators;
  the second charger having a plurality of labels;

the second charger having a plurality of wired connections;
the second charger having a plurality of magnets;
the second charger having at least one induction charger;
the second charger having a securement aperture;
the second charger having a first extension;
the second charger having a second extension;
 wherein the second charger is configured to deliver an electrical current, thereby recharging a second earphone.
19. The system of claim 17, further comprising:
the computing platform having a detection system;
 wherein the detection system is configured to detect when an earphone has been inserted into either the first charger or the second charger;
a sensing system;
the sensing system having a plurality of sensors.
20. A method of charging earphones while the earphones are in use, comprising the steps:
 providing a smart device;
 providing a power source;
 providing a plurality of earphones;
 providing a case;
 providing a plug;
  the plug extending a length from a first end to a second end;
  the plug having a converter;
  the plug having a cover;
  the plug having an adaptor; wherein the plug is configured to plug into an adaptor;
 providing a primary cable;
  the primary cable extending a length from a first end to a second end;
  the primary cable having a conductor;
  the primary cable having a cover;
 providing a splitter;
  the splitter extending a length from a first end to a second end;
  the splitter having a plurality of conductors;
  the splitter having a plurality of indicators;
  the splitter having a plurality of labels;
 providing a first charger cable;
  the first charger cable extending a length from a first end to a second end;
  the first charger cable having a conductor;
  the first charger cable having a cover;
 providing a second charger cable;
  the second charger cable extending a length from a first end to a second end;
  the second charger cable having a conductor;
  the second charger cable having a cover;
 providing a first charger;
  the first charger extending a length from a first end to a second end;
  the first charger having a main body;
  the first charger having a hollow interior;
  the first charger having an exterior surface;
  the first charger having a plurality of indicators;
  the first charger having a plurality of labels;
  the first charger having a plurality of wired connections;
  the first charger having a plurality of magnets;
  the first charger having at least one induction charger;
  the first charger having a securement aperture;
  the first charger having a first extension;
  the first charger having a second extension;
   wherein the first charger includes a relatively soft material for accepting different types of earphones having different shapes and sizes, within close and tight tolerances;
   wherein the first charger is configured to deliver an electrical current, thereby recharging a first earphone;
 providing a second charger;
  the second charger extending a length from a first end to a second end;
  the second charger having a main body;
  the second charger having a hollow interior;
  the second charger having an exterior surface;
  the second charger having a plurality of indicators;
  the second charger having a plurality of labels;
  the second charger having a plurality of wired connections;
  the second charger having a plurality of magnets;
  the second charger having at least one induction charger;
  the second charger having a securement aperture;
  the second charger having a first extension;
  the second charger having a second extension;
   wherein the first charger includes a relatively soft material for accepting different types of earphones having different shapes and sizes, within close and tight tolerances;
   wherein the second charger is configured to deliver an electrical current, thereby recharging a second earphone;
 providing a computing platform;
  the computing platform having a detection system;
   wherein the detection system is configured to detect when an earphone has been inserted into either the first charger or the second charger;
  the computing platform having a processor;
  the computing platform having a memory;
  the computing platform having a graphical user interface;
   the graphical user interface having a display;
    wherein the display of the graphical user interface provides information and interactions related to the system;
 providing a sensing system;
  the sensing system having a plurality of sensors;
 providing an application server.

\* \* \* \* \*